(12) United States Patent
Munsch

(10) Patent No.: US 7,114,924 B2
(45) Date of Patent: Oct. 3, 2006

(54) BLADE PIN ALIGNMENT AND POSITIONING SYSTEM FOR INSTALLATION OF HELICOPTER ROTOR BLADES

(76) Inventor: Donald Terryl Munsch, 3708 MacGregor Dr., Columbia, SC (US) 29206

( * ) Notice: Subject to any disclaimer, the term of this patent is extended or adjusted under 35 U.S.C. 154(b) by 0 days.

(21) Appl. No.: 10/906,875

(22) Filed: Mar. 10, 2005

(65) Prior Publication Data

US 2006/0147309 A1    Jul. 6, 2006

Related U.S. Application Data

(60) Provisional application No. 60/552,407, filed on Mar. 10, 2004.

(51) Int. Cl.
*B64C 27/50*    (2006.01)
*B25B 25/00*    (2006.01)

(52) U.S. Cl. .................................. 416/143; 81/488

(58) Field of Classification Search ................ 416/143, 416/142; 81/488
See application file for complete search history.

(56) References Cited

U.S. PATENT DOCUMENTS

2004/0173062 A1*    9/2004    DeFrancisci ................. 81/488

* cited by examiner

*Primary Examiner*—Edward K. Look
*Assistant Examiner*—Richard A. Edgar
(74) *Attorney, Agent, or Firm*—Calhoun Thomas, III; Samuel Alexander Long, Jr.

(57) ABSTRACT

A blade pin alignment and positioning system for the installation of helicopter blade pins, including an elongated alignment pin and at least one drive member. The drive member is configured to mate with the top end of the alignment pin for use in driving the alignment pin to its initial position in blade installation. Then the drive member is removed from the top of the alignment pin. The exposed top end of the alignment pin is configured to mate with the insertion end of a blade pin. The other end of the alignment pin is tapered for easy operation in alignment of the blade root holes with the holes in the lead lag link portion of the main rotor hub.

4 Claims, 5 Drawing Sheets

BLADE PIN ALIGNMENT AND POSITIONING SYSTEM FOR INSTALLATION OF HELICOPTER ROTOR BLADES

RELATED APPLICATIONS

Provisional Application 60/552,407, filed on March 10, 2004

FEDERALLY SPONSORED RESEARCH OR DEVELOPMENT

Not Applicable

REFERENCED OR INCORPORATED MATERIAL

Not Applicable

BACKGROUND OF THE INVENTION

The present invention relates to the maintenance of helicopters. In particular, the present invention relates to a blade positioning system used for the installation of helicopter rotor blades.

Helicopters are useful for a broad range of short-range and medium-range flight missions due to their versatility, load-carrying capacity, and ability to take off and land in a vertical path. This VTOL ("Vertical Take-Off and Landing") capability is particularly useful for maritime flight operations where the available space is strictly limited. It is also useful in field operations where suitable landing strips for other aircraft may not be readily available.

The flight capability of a typical helicopter is provided by at least one main rotor assembly having a plurality of rotor blades, with an overall structural envelope that typically extends far beyond the helicopter body. This results in the need for a large amount of storage space per helicopter, whether it is stored in a hangar, stowed below-decks in an aircraft carrier or other vessel, or stored in an aircraft for transport to a location in the field. Stimulated by the strategic and tactical considerations of military as well as civilian use, helicopter designers have taken various approaches to reducing the space requirements for helicopter storage during routine transport and stowage, while not compromising the need for rapid deployment.

One approach is a main rotor assembly with removable rotor blades which can be stacked for storage, greatly reducing the structural envelope of the helicopter. With the rotor blades removed, several helicopters can be stored in the space required for one fully-deployed helicopter. However, main rotor assemblies may be complex in design, and once removed, reinstallation of the blades is labor-intensive and time-consuming. Many helicopter blades have bifurcated ends that must be precisely aligned with corresponding hub structures when the blades are reattached to the main rotor assembly. The sheer weight and size of the blades makes this process difficult for the involved personnel.

Another approach is the type of blades known as "folding" blades. Both automated and manual folding blade assemblies are available. Automated assemblies typically require extensive modifications to the main rotor assembly as well as software to regulate the blade folding operations, all of which increases the complexity and cost of the helicopter. Automated blade folding assemblies may also have higher maintenance requirements and decreased reliability when compared to conventional, fixed-blade rotor assemblies. Manual folding blade assemblies require fewer modifications to the main rotor assembly. In a typical manual folding blade assembly, the individual rotor blades are attached to a rotor hub by blade pins. In one type of rotor assembly with folding blades, removal of one of a pair of blade pins allows the blade to pivot around the remaining pin into a folded position. The structural envelope of the rotor assembly is more compact with the blades in the folded positions than when the blades are deployed for use, resulting in correspondingly less need for storage space.

Correct blade alignment is crucial for both flight safety and accurate navigation. Thus, whenever helicopter blades are disassembled, there are concerns about the proper alignment of the blades when they are re-deployed for use. Whether the blades are folded or removed totally, they must be properly realigned with the hub before the blade pins can be installed. Because of the size of the main rotor blades, even small displacements such as are easily induced by wind gusts, inaccuracies in aligning the blades, etc can lead to compromised safety and navigational errors. A main rotor blade can easily be 20 feet long and weigh over 150 pounds with a center of gravity 10 feet out from the rotor hub, making it difficult for service personnel to position and align the blades correctly.

Mechanisms for servicing helicopters, including a variety of blade alignment mechanisms are available. By way of example, Muylaert (U.S. Pat. No. 6,213,712) discloses a helicopter blade positioning mechanism for foldable rotor blades. The system includes a connection which can be attached to the pitch control housing and which can pivot relative to the housing with two degrees of freedom, a rotor blade clamp which can be attached to a rotor blade, and a clamp positioner which positions the rotor blade clamp at a distance from the connection after removal of one of the blade pins. The mechanism permits the rotor blade to pivot about the remaining blade pin, allowing controlled folding of the main rotor blade while the blade remains attached to the pitch control housing.

Ide, et al (U.S. Pat. No. 5,946,981) describe an automatic pitch link adjuster for helicopter rotor blades. The adjuster includes a diamond-shaped frame that carries a worm and a worm wheel mounted to a turnbuckle shaft, and an electric motor coupled to the worm shaft through a spline. The pitch link is adjusted by operating the motor to rotate the shafts with respect to each other.

Noehren, et al. (U.S. Pat. No. 5,263,821) provide a mid-beam jointed reconfigurable bearingless main rotor assembly that facilitates removal or folding or the main rotor blade of a helicopter. The torque tube subassemblies include access panels (for blade removal) and removable splice tubes (for blade folding).

Costanzo, et al. (U.S. Pat. No. 5,149,013) disclose a retractable helicopter rotor where the connection between the rotor support system and the fuselage is a single interface between overlapping circumferentially extending flanges joined together by compression-loaded bolts. The rotor, swashplate, and pitch change rods are moved as a unit between an operational position and a retracted stowage position, without requiring disconnection and reconnection of the pitch change rods.

Covington, et al. (U.S. Pat. No. 4,252,504) show a helicopter blade folding system with blade pins which are locked in place by a latch plate. Each pin has an annular groove that is mated to a corresponding aperture in the latch plate.

Mayerjak (U.S. Pat. No. 4,156,583) provides a hub assembly for an articulated rotor system that includes three plates centrally secured to the shaft. The assembly supports blade retention assemblies that are equally spaced about the rotor shaft.

Alignment tools are used with other apparatus where precise alignment of components is desired. For example, Allyn, et al. (U.S. Pat. No. 6,371,209) disclose a casing installation and removal adapter for downhole well drilling apparatus. The adapter is mounted on the lower end of a pneumatic hammer drill, and couples the drill to a pipe string maintaining a movable part of the drill in an operative condition. This enables the drill to operate while rotational torque and upward directed force are simultaneously applied during removal of a casing from a downhole position. The adapter includes a cylindrical main portion threaded with a male hammer chuck thread which mates with the female hammer chuck thread within the lower end of a hammer drill barrel. A reduced-diameter cylindrical portion engages the lower end of a hammer drill and operates to maintain the piston in the hammer drill barrel.

Bocking, et al (U.S. Pat. No. 4,681,175) show an auto-coupling tool for drill-pipes having a body portion with a female-threaded adapter at one end and a tapered, multi-intertwined-spiral bit portion at the other end. The tool is used to retrieve broken drill pipes.

Esperandieu, et al (U.S. Pat. No. 5,909,935) provide a device used for guiding, driving, and locking a slot-in module in a cabinet (the module contains electrical or electronic equipment whose circuitry is to be connected to the circuitry of the cabinet). Their device includes a slideway and a slide fixed to the cabinet and the module, respectively, for guiding the module into its proper position.

Bittner (U.S. Pat. No. 5,813,300) shows a precision center with interchangeable double-arcuate floating collet, used for mounting a workpiece for precision machining. This device includes a modified head center, a drive assembly mounted within the head center and mechanically coupled to an actuating assembly, and a double-arcuate floating collet.

Williams, et al (U.S. Pat. No. 4,890,947) disclose a mounting adapter for a centrifuge rotor. The adapter includes a spud member with an internal chamber defined by a locking surface and a lifting surface, with a threaded access bore and a mounting bore (see Fig). A connecting member has a head confined within the chamber and a shank extending into the mounting bore, and is rotatable by a tool extended through the access bore.

Deutsch (U.S. Pat. No. 4,488,842) shows an improved nose member for an expandable bushing type locking assembly of the type which includes a handle with camming means at one end to operate the bushings. The improvement consists of a nose cone on the free end of the locking pin, positioned so as to overlie the adjusting nut. The tapered nose cone guides the pin into the parts to be assembled.

Battrick (U.S. Pat. No. 4,237,754) provides a universal spud wrench has a tubular shaft with four perpendicularly oriented sloped surfaces that form four longitudinal slots, with aligned extensions (with different diameters) adjacent the slots and a cross-wise shaft to facilitate turning.

Fenton (U.S. Pat. No. 4,191,228) discloses a tool which includes a drive member (such as a lever arm or shaft), a driven member (the object to be turned), and a torque transfer assembly having a male portion formed on one of the drive and driven members and a female portion on the other member. The drive member can turn the driven member in only one direction; it disengages when turned in the opposite direction.

Despite the availability of alignment tools and servicing tools, there remains a need for a simple, reliable system for the efficient installation of helicopter rotor blades. An ideal system would result in correctly and reproducibly aligned blades, and be straightforward to implement regardless of operating conditions. Further, it would reduce the amount of wear and tear that the alignment process exposes blade pins to when connecting blades to main rotor hubs.

SUMMARY OF THE INVENTION

According to its major aspects and broadly stated, the present invention is an alignment and positioning system for the installation of helicopter blade pins, including an elongated alignment pin and a drive member. The drive member is configured to mate with the top of the alignment pin for use in blade installation. The top end of the alignment pin is also configured to mate with the insertion end of a blade pin. The bottom end of the alignment pin is configured for operation in blade installation.

For installation of a helicopter blade pin, the blade is inserted into a selected lead lag link (sometimes also called a "blade grip") of the hub and the respective holes of the blade root and the lead lag link are approximately aligned. The downward, tapered end of the alignment pin is inserted into the top through hole in the top of the lead lag link, and then the tip of the pin is further maneuvered downward into a corresponding through hole in the blade root. The user pushes the alignment pin downwards, manipulating the pin via the drive member through rest of the holes, until the blade root and the lead lag link are properly aligned. At this point the alignment pin probably is being held in place by friction or possibly by the user reaching under to hold it in place. The user then removes the drive member from the top of the alignment pin and inserts the blade pin into the open top end of the alignment pin. Making sure that the other members of the crew hold the blade itself stead, the user and gently pushes the blade pin downwards until the alignment pin is pushed out completely and the blade pin is installed in its place. In one embodiment of this invention, a third element described as a gap spacing tool (hereinafter called a "spork") is used to make sure that a gap of 0.045 inches is maintained between the top of the lead lag link and the bottom of the top washer of the blade pin. Whether using the spork or not, once the blade pin is in place the user then secures it using the standard spring clip with cam mechanism to lock the blade pin in place.

The alignment pin is an important feature of the present invention. The alignment pin has its top end configured to mate in different ways with both the drive member and the blade pins with which it is used. In the preferred embodiment of the invention, the downward end of the alignment pin is tapered to enable the user to ease the holes in the lead lag link and the blade root into alignment and thus cause the helicopter blade to be correctly positioned.

The drive member is another feature of the present invention, and is used to insert and manipulate the alignment pin. In the preferred embodiment, the drive member provides the user with a means to better control the insertion and manipulation of the alignment pin into the correct position to facilitate for the ultimate installation of the blade pin.

The spork is an optional element of this invention. The spork is dimensioned to enable blade pin installation users to leave a standard size space between the top of the lead lag link surface and the bottom of the top washer on the blade pin. Regulations call for this gap to be between 0.020 and 0.060 inches. The spork has a thickness of 0.045 inches which is consider the optimum gap spacing.

Still another feature of the present invention is its versatility. The system can be dimensioned and configured for virtually any types of blade pins used to secure helicopter rotor blades as well as the rotor blades of other aircraft or vessels.

Additional features of the present invention are its ease of use and durability. The system allows a crew of three (a crane operator and two mechanics) to install a typical helicopter blade in a minute or thereabouts, with minimal special training requirements. The system is durable, with all its components being made of stainless steel or other materials that are suitable for use in harsh environments.

Other features and advantages of the present invention will be apparent to those skilled in the art from a careful reading of the Detailed Description of Preferred Embodiments presented below and accompanied by the drawings.

DETAILED DESCRIPTION

Figure 1:
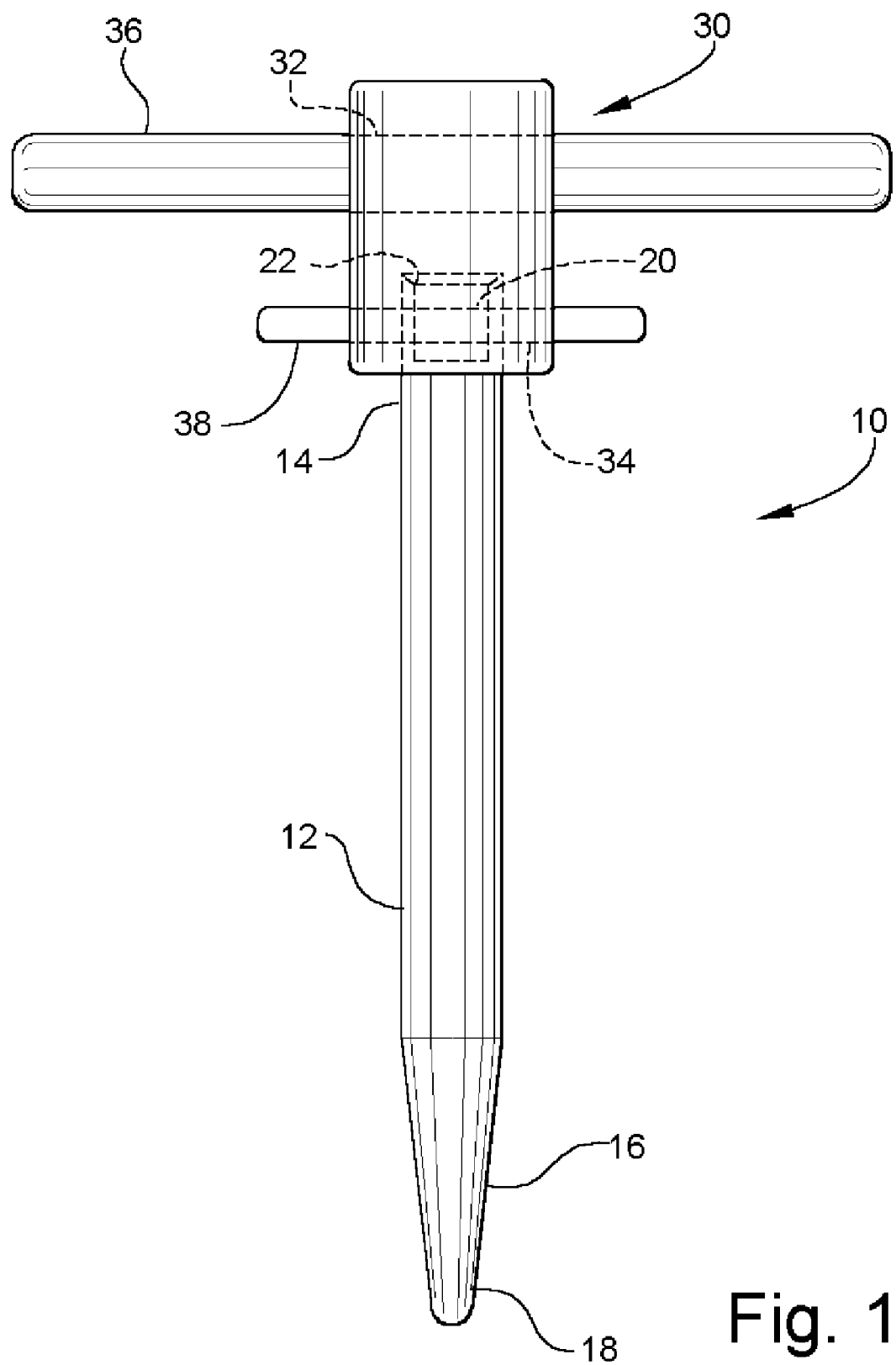
FIG. 1 is an elevation view of the main components of the blade pin installation tool according to a preferred embodiment of the present invention.
Figure 2:
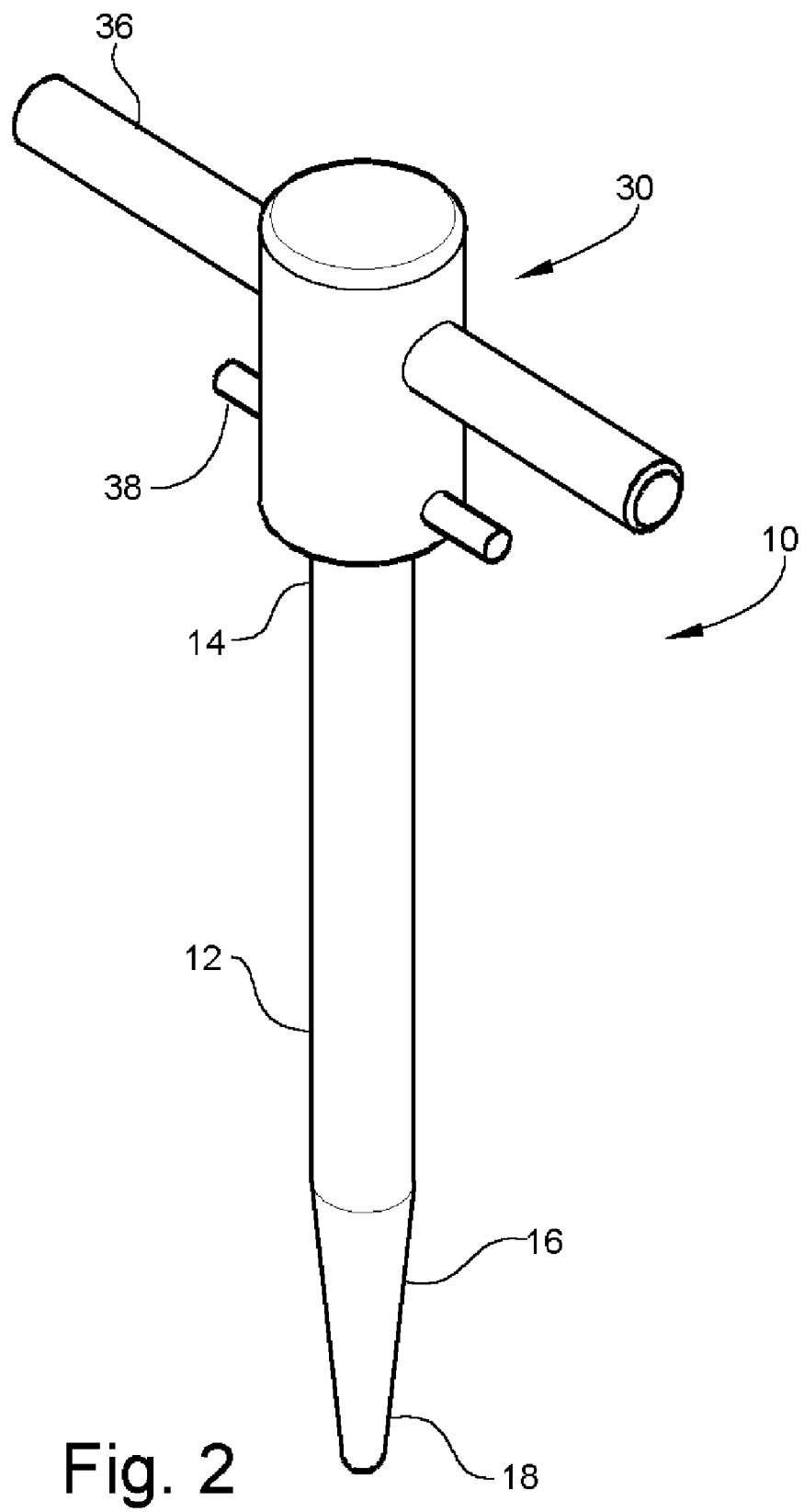
FIG. 2 is an angled view of the alignment pin and the drive member of FIG. 1.

In the following detailed description of the preferred embodiments of the invention, reference numerals are used to identify structural elements, portions of elements, surfaces or areas in the drawings, as such elements, portions, surfaces or areas may be further described or explained by the entire written specification. For consistency, whenever the same numeral is used in different drawings, it indicates the same element, portion, surface or area as when first used. Unless otherwise indicated, the drawings are intended to be read together with the specification, and are to be considered a portion of the entire written description of this invention as required by 35 U S C §112. As used herein, the terms "horizontal," "vertical," "left," "right," "up," "down," as well as adjectival and adverbial derivatives thereof, refer to the relative orientation of the illustrated structure as the particular drawing figure faces the reader.

The present invention, referring now to each of FIGS. 1, 2, 3, 4, and 5, is there shown to be a blade pin installation tool 10 for alignment of helicopter rotor blades. The invention is comprised of the alignment pin 12 and the drive member 30. An alternate embodiment includes the use of the spork 60 shown in FIG. 5. Installation tool 10 includes an elongated shaft or alignment pin 12 with a first end 14 and a second, tapered end 16. First end 14 has formed therein a stepped cavity 20 with a shoulder portion 22 (seen in FIGS. 1, 3, and 4). One bore 34 is cross-drilled through cavity 20 in the upper portion of shaft 12 to accommodate shaft 38. The second lower end 16 may be generally conical with a rounded tip 18; however, other configurations may also be useful.

Figure 3:
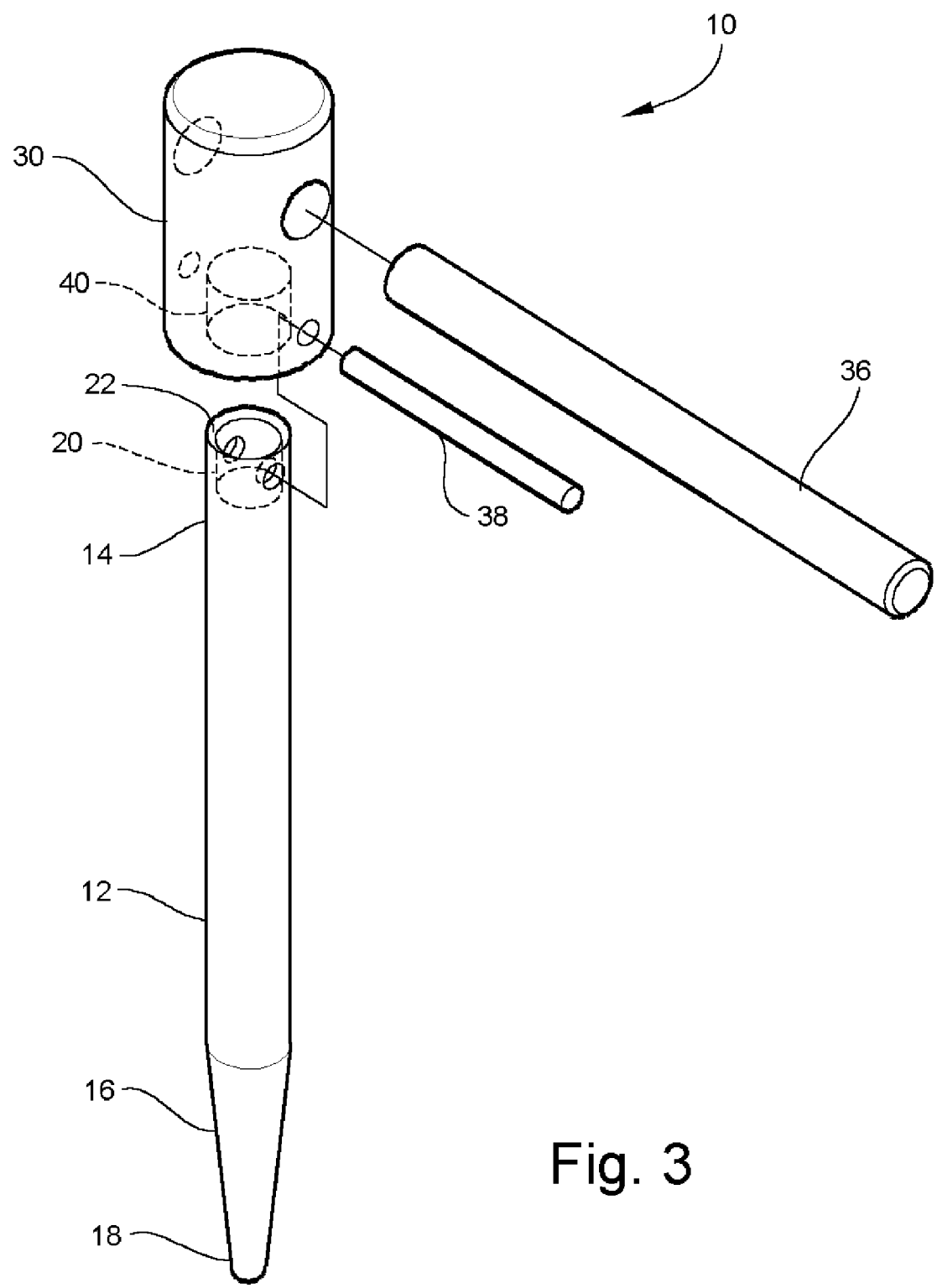
FIG. 3 is an exploded view of the alignment pin and the drive member of FIG. 1.
Figure 4:
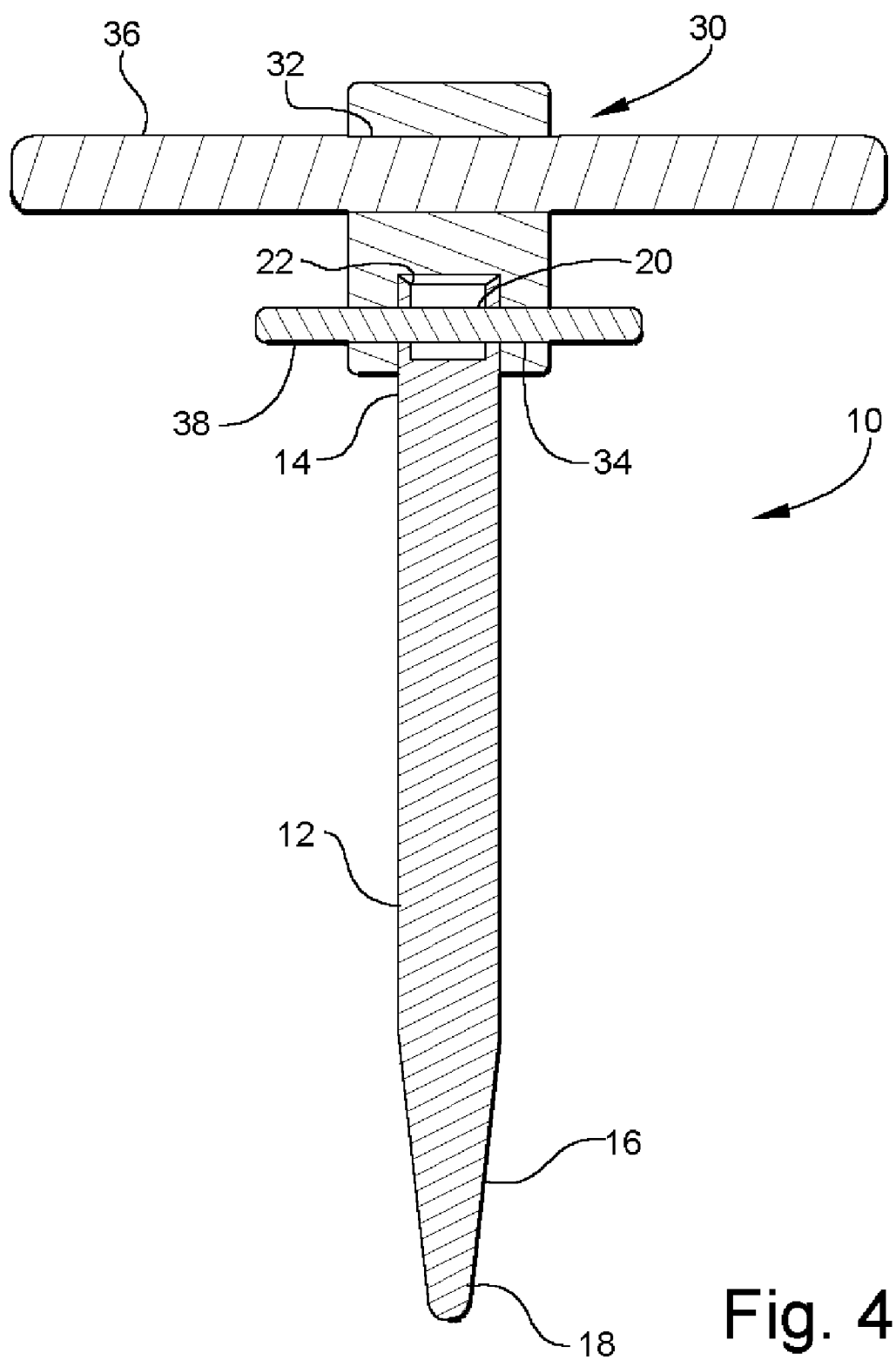
FIG. 4 is a cross-sectional view of FIG. 1.

A generally cylindrical drive member 30 is cross-drilled with two bores 32, 34, dimensioned to accommodate shafts 36, 38, respectively. Shafts 36, 38 are installed in bores 32, 34, respectively in a slidable manner so as to facilitate the turning of tool 10. Shaft 38 serves to lock alignment pin 12 to turn with drive member 30. A cavity 40 is formed at one end of drive member 30 (FIG. 3). The embodiment shown in FIGS. 1–5 shows shaft 36 as being larger than shaft 38. This larger shaft 36 may give a user greater control of the drive member 30 and thus the tool 10. However, in some configuration bores 36, 38 may have the same diameters so that same sized shafts (such as shaft 38) may be used in both bores.

Figure 5:
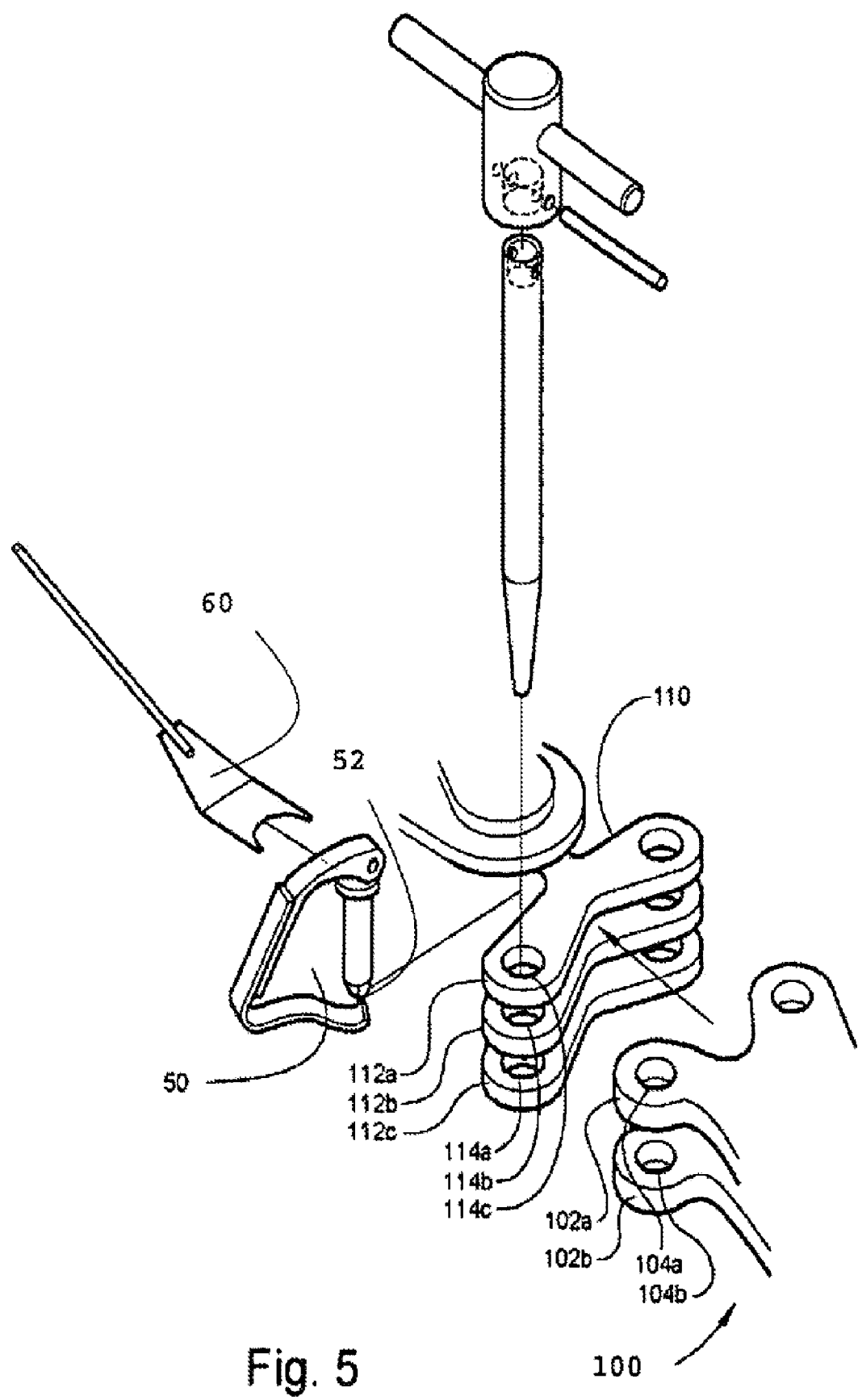
FIG. 5 is a different exploded view showing (i) where the blade pin goes when the drive member is removed, (ii) the lead lag link, (iii) the blade root and (iv) the spork.

Cavity 20 is configured and dimensioned to accommodate the tips of blade pins with which installation tool 10 is used. As shown in FIG. 1 and FIG. 5, cavity 20 with shoulder 22 receives a bottom tip of a blade pin 50 when the locking clip is pulled back out of the way. For optimum control by the user and optimum alignment of the blades, the depth of cavity 20 is approximately the same as the length of the bottom tip of the blade pin 50; shoulder 22 of shaft 12 is configured to substantially engage the wider portion of blade pin 50 just above and connected to the bottom tip when the pin is fully inserted into cavity 20. The cross-sections of cavities 20 and 40 are generally circular in shape for efficient manufacturing. However, in the case of cavity 20 differently shaped cross-sections may be useful to accommodate differently shaped blade pins or portions thereof. For example, in some limited cases cavity 20 may have a hexagonal cross-section when this will better align blade pins with hexagonal bottom tips.

Installation tool 10 is used to align helicopter blade roots with corresponding lead lag link structures. FIG. 5 shows the blade root portion of a helicopter blade 100 with a bifurcated end with two end portions 102*a*, 102*b*. The end portions have throughholes 104*a*, 104*b* formed there through. A lead lag link 110 has a plurality of blade grips with spaced-apart portions 112*a*, 112*b*, 112*c*, having throughholes 114*a*, 114*b*, 114*c*, respectively, formed there through.

As noted above, the dimensions of installation tool 10 are such as to accommodate the blade pins with which the tool is used. For use with a typical helicopter blade pin, drive member is approximately 3" high and may be machined of 2" diameter round bar stock. Shaft 36 is approximately ¾" in diameter for use in bore 32. Shaft 38 is approximately ⅜" in diameter for use in bore 34. Alignment pin 12 has approximately the same diameter as blade pin 50. In the typical case, alignment pin 12 and the blade pin 50 are both approximately 1" in diameter. However, the configuration and dimensions of installation tool 10 can readily be changed to accommodate different sizes of blade pins.

The components of installation tool 10 are preferably machined of sturdy, durable materials such as corrosion resistant stainless steel. Materials that are resistant to harsh environmental conditions are generally preferred. For example, all components may be made of Type A2 tool steel hardened to Rockwell RC60.

In operation, assembles the tool 10 and then blade root 100 is inserted into a selected lead lag link 110 so that throughholes 104*a*, 104*b* of blade root 100 are approximately aligned with throughholes 114*a*–*c* of lead lag link 110. The user inserts tip 18 of alignment pin 12 into one of the uppermost throughholes (throughhole 114*a*) of lead lag link 110. He or she then maneuvers tapered end 16 of alignment pin 12 downwards, turning the alignment pin by turning shaft 36 as may be needed to jockey tip 18 into each succeeding throughhole. The taper of end 16 draws throughholes 114*a* and 104*a* into alignment as end 16 descends. Similarly, the taper of end 16 draws each succeeding pair of throughholes (104*a* and 114*b*, 114*b* and 104*b*, 104*b* and 114*c*) into alignment. The body of shaft 12, which has a diameter just less than the diameter of throughholes 104*a*, 104*b*, 114*a–c*, maintains the throughholes in alignment.

Then, the user removes drive member 30 by first removing the shaft 38 that locks alignment pin 12 to drive member 30. He or she then inserts tip 52 of blade pin 50 into cavity 20. He or she pushes the blade pin 50 and the alignment pin 12 downwards to cause blade pin 50 to be smoothly inserted into all throughholes. When blade pin 50 is properly installed in throughholes 104*a*, 104*b* and 114*a–c*, alignment pin 12 will have dropped out of the last throughhole. An additional embodiment uses the spork 60 to appropriately set the distance between the top of the lead lag link 110 surface and the underside of the top washer of the blade pin 50 at the standard 0.045" gap space as required of typical helicopter blade pin insertions as herein shown. The user secures the blade pin with the standard cam locking mechanism or other suitable fasteners. A crew of three (one crane operator and two mechanics) can install a typical blade in a minute or less. Installation tool 10 is easy to use, and requires minimal instruction, adaptation and maintenance.

In addition to reducing the time needed to install a helicopter blade pin, use of a suitably-dimensioned installation tool 10 increases the useful life of both the blade pin and associated components (bushings, bolts, etc.). This increased equipment lifetime is due to the reduction of frictional wear due to the force-fitting required for a conventional blade pin installation. Indeed, installation tool 10 helps ensure that all blade roots 100 are installed to uniform tolerances, each and every time.

With respect to the above description of the invention, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing description is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Thus, it will be apparent to those skilled in the art that many changes and substitutions can be made to the preferred embodiment herein described without departing from the spirit and scope of the present invention as will be defined by the claims.

What is claimed is:

1. A tool for use in installation of helicopter rotor blades comprising:

(a) An alignment pin that is a cylindrical elongated shaft with a cross sectional diameter equal to the diameter of the helicopter blade pins it is used with in connecting helicopter blade roots with their corresponding lead lag link structures on the helicopter rotor;

(b) A top end of said alignment pin shaft that has a cavity sized and configured so as to mate with the typically round or hexagonal bottom tip of the helicopter blade pins that the tool is designed to be used with and a cross bore hole through both sides of the referenced cavity in said top end of the alignment pin;

(c) A bottom end that is tapered to facilitate proper alignment of the throughholes of the helicopter blade roots with the throughholes of the lead lag link structures;

(d) A drive member that is a generally cylindrical shaft with bore hole and cross shaft that facilitate locking of the drive member to the alignment shaft;

(e) A top end of said drive member that is sized and configured so as to be comfortable for the user to grip and turn;

(f) A bottom end of said drive member that has a cavity sized to receive the top end of the alignment shaft with said drive member and its bottom cavity having a transverse bore hole and corresponding shaft capable of being inserted in and through said bore hole in a slidable manner to facilitate turning of the drive member and temporary locking of the drive member and alignment shaft together.

2. The tool of claim 1 wherein there are two cross shafts and the drive member has two cross bore holes with one hole closer to the top of the drive member being sized to accept a larger shaft in a slidable manner that allows the cross shaft to be used primarily for rotating the tool as it is inserted into the throughholes and the other cross bore hole being closer to the lower end of the drive member so that it intersects the referenced cavity in the bottom of the drive member and is sized to accept a smaller shaft in a slidable manner that allows this lower cross shaft to be used primarily for temporarily locking the drive member and the alignment shaft while the drive member is being used to maneuver the alignment shaft into position.

3. The tool of claim 2 wherein the drive member is between 2" and 4" tall and between 1.5" and 3" in diameter, the top cross shaft is between ½" and 1" in diameter, the lower cross shaft is between ¼" and ½" in diameter and, in the case where a particular helicopter blade pin is 1" in size, the diameter of the main body of the shaft for the alignment pin is the same size as said blade pin.

4. The tool of claim 1 wherein an optional spork component with a simple handle and flat crescent blade that is 0.045" thick is used to properly position the underside of the top washer of the helicopter blade pin a standard 0.045" above the top of the lead lag link structure at the point where the blade pin has followed the alignment pin through the throughholes into full blade pin insertion position.

* * * * *